(12) United States Patent
Suzuki et al.

(10) Patent No.: US 7,477,307 B2
(45) Date of Patent: Jan. 13, 2009

(54) IMAGE CONVERSION DEVICE

(75) Inventors: Masayasu Suzuki, Yokosuka (JP); Takeshi Akatsuka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 609 days.

(21) Appl. No.: 11/145,265

(22) Filed: Jun. 2, 2005

(65) Prior Publication Data

US 2005/0285938 A1 Dec. 29, 2005

(30) Foreign Application Priority Data

Jun. 8, 2004 (JP) ............................. 2004-169918

(51) Int. Cl.
*H04N 3/14* (2006.01)
*H04N 5/335* (2006.01)
*H04N 9/74* (2006.01)
*H04N 7/18* (2006.01)
*H04N 9/47* (2006.01)

(52) U.S. Cl. ...................... 348/317; 348/148; 348/159; 348/218.1; 348/333.05; 348/588

(58) Field of Classification Search .............. 348/218.1, 348/148, 159, 588, 317
See application file for complete search history.

(56) References Cited

U.S. PATENT DOCUMENTS

| 4,713,685 | A | * | 12/1987 | Nishimura et al. | .......... | 348/148 |
| 5,801,788 | A | * | 9/1998 | Ashida et al. | ............... | 348/588 |
| 6,559,896 | B1 | * | 5/2003 | Zwartenkot et al. | ......... | 348/714 |
| 6,774,950 | B1 | * | 8/2004 | Jiang | ........................... | 348/526 |

* cited by examiner

*Primary Examiner*—David L Ometz
*Assistant Examiner*—Wanda M Negron
(74) *Attorney, Agent, or Firm*—Global IP Counselors, LLP

(57) ABSTRACT

An image conversion device connected to multiple image detection mechanisms generating field image data of the surroundings and having multiple input buffers for each of the multiple image detection mechanisms, which, in parallel, stores, moves, performs conversion processing and displays said field image data in one field units in accordance with a display template in pattern memory, thereby reducing the total delay time from field image generation to display to the driver.

8 Claims, 7 Drawing Sheets

(a)

(b)

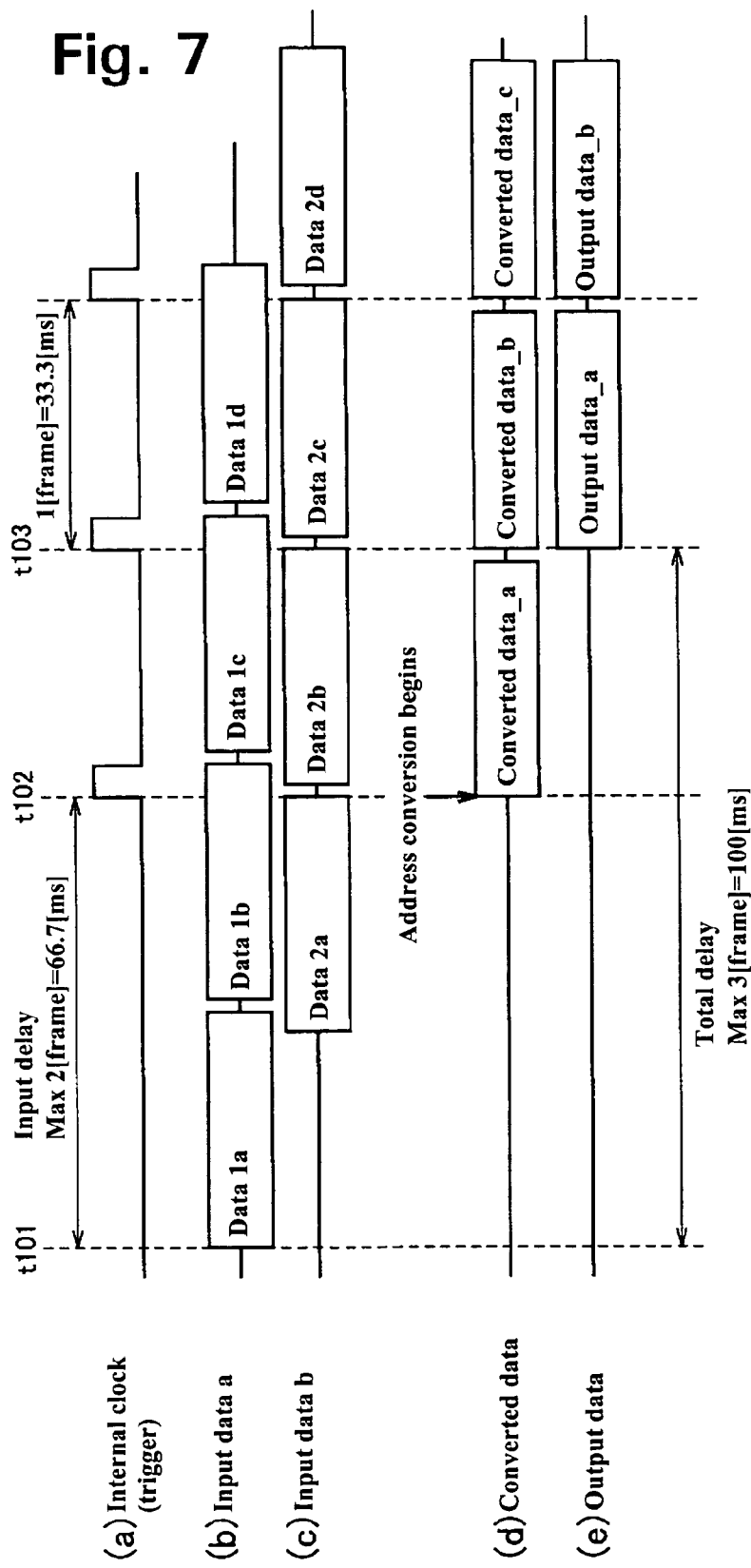

IMAGE CONVERSION DEVICE

This application claims the benefit of Japanese Application No. 2004-169918, filed Jun. 8, 2004, the entirety of which is incorporated herein by reference.

FIELD OF THE INVENTION

The present invention relates to an image conversion device which performs address conversion processing for multiple images in order to present these multiple images on a display.

BACKGROUND OF THE INVENTION

Vehicle surroundings image conversion devices have been used in driver support systems for assisting and aiding the vision of a driver in situations when a driver is backing a vehicle (such as parking in a garage or inching close to another vehicle) or driving forward and entering an intersection where visibility is poor or a T-shaped intersection.

The places imaged by the camera connected to such a vehicle surroundings image conversion device are, for example, behind the vehicle for the purpose of displaying a rear view, and the left and right directions from the front of the vehicle for the purpose of displaying blind corner views. There is a need to simultaneously present views in multiple directions to the driver. Hence, a driving support system utilizes multiple cameras imaging in various differing directions picking up images of the surroundings of a vehicle, and by virtue of a vehicle surroundings image conversion device arranges and displays multiple images on a single screen of a monitor and presents them to a driver.

In a vehicle surroundings image conversion device like this a technology for synchronizing the images picked up by the multiple cameras has been described in Official Gazette of Japanese Unexamined Patent Application Hei 11-317908. This approach connects multiple cameras and a controller, and by virtue of this controller creates a synchronizing signal and sends it to each camera, and each camera in turn sends an image signal to the controller in accordance with this synchronizing signal. The controller then performs image conversion processing of the image signals that the multiple cameras have picked up and then displays the processed images on a monitor.

The inventors recognized that this prior art approach is complex, because the configuration for the controller needs to create a synchronizing signal and provide a signal line for supplying the synchronizing signal to each camera. In contrast to this prior art approach, there is a technology with a simple configuration which does not utilize a synchronizing signal to synchronize the image signals picked up by each camera, but rather, receives an image signal from each camera and synchronizes each of the image signals by accumulating these respective image signals temporarily in a buffer. For example, the following will explain the resolution of an image data picked up by the respective cameras and the resolution of the monitor presenting it to the driver as VGA size (Video Graphics Array, 640×480 picture elements). Likewise, the following will explain the updating of data presented to the driver when processing in 1 frame units.

Each camera sends an image signal according to the timing of its respective internal clock, and the vehicle surroundings image conversion device has 3 input buffers which have 1 frame of memory volume (address space of 640×480 picture elements) on each buffer's input side and output side for each camera system connected. That is to say, the vehicle surroundings image conversion device has an input buffer with 3 frames of memory volume by way of an input phase, a standby phase and an output phase (each having 1 frame of memory volume). By virtue of this, when an image signal of 1 frame from a certain camera has completed input to the input phase, the device stores this image signal of 1 frame in the standby phase, and when image signals of 1 frame are stored in the standby phase of input buffers associated with all cameras, the device moves the image signals of all cameras from the standby phase to the output phase. Then the vehicle surroundings image conversion device simultaneously reads the multiple image signals stored in the output phase and performs image conversion for displaying them on a monitor, for example. By doing this, even though each of the cameras is not synchronized, the device matches the reading phase of image signals, absorbs the asynchronous input of multiple cameras and performs synchronization.

At this time the CPU (Central Processing Unit) in the vehicle surroundings image conversion device endeavors to synchronize the image signals by rotating the 3 phases of the input buffer. Then the CPU reads the image signal stored in the side designated for address conversion processing, in other words the output side of the input buffer, in frame units according to the input buffer reading address stored in pattern memory, performs address conversion processing, creates an image signal for displaying on a monitor and stores this in an output buffer. Incidentally, the address space provided in pattern memory is equivalent to the resolution of the monitor which presents the image after address conversion to the driver and in this case would be 640×480 picture elements.

However, with the technology described above, because the image signal input from each camera is processed in single frame units, a delay of a maximum of approximately 2 frames occurs in order to obtain synchronization between respective image signals in the input buffer. Additionally, if address conversion processing is performed and the timing for displaying an image is synchronized with the timing stored of images from all cameras in the output side of the input buffer, a delay of a single frame occurs. Thus a delay of a total of 3 frames will occur from the time the image signal is stored in the input side of the input buffer to the time that it is stored in the output buffer.

How a maximum of a delay of 3 frames occurs in this way will now be explained with reference to FIG. 7. For example, when 2 NTSC (National Television System Committee) cameras (camera A, camera B) are connected to a vehicle surroundings image conversion device, posit that from time t101 image data from camera A (input data 1a) begins to be received in the input side of an input buffer and later than this time t101 image data from camera B (input data 1b) begins to be received in an input side of an input buffer (FIGS. 7(b), (c)). If one posits that these cameras A and B are the known imaging type NTSC type (frame rate 29.97 fps) and the time that the input data of 1 frame of camera A and camera B have finished being stored in the output sides of the respective input buffers is t102, the delay time required for input will be approximately 2 frames. Then, the respective input data from the output side of the input buffer is read at this time t102, conversion processing begins (FIG. 7(d)) and the time that converted data is actually finished being stored in an output buffer as output data will be t103 (FIG. 7(e)). Thus, the total delay time from the time that input data of camera A begins to be input, t101, to the time that output data is output to a monitor etc. and displayed, t103, will be approximately 100 msec.

As a result of this total delay time, a vehicle equipped with a vehicle surroundings image conversion device ascertaining an object moving at a relative speed of 36 km will cause the obstacle to be displayed approximately 1 m from the actual position of the obstacle. While some delay can be permissible when using a vehicle surroundings image conversion device in lower speed ranges, such as parking and inching closer to another vehicle, it is unacceptable when using it when entering an intersection with poor visibility or a T-shaped intersection. In addition, in a situation with moderate to high speeds such as passing between two cars or converging, the discrepancy between the position of the obstacle which is displayed and the actual position of the obstacle will increase even more.

Moreover, when the discrepancy between the position of the obstacle which is displayed and the actual position of the obstacle increases, problems occur such as when one's vehicle has begun to move and although the actual vehicle is moving the picture on the monitor is not moving, or when one's vehicle has stopped and the actual vehicle is not moving but the picture on the screen is moving. This inconsistency between the movement of the vehicle and the movement of the picture on the monitor makes the driver feel uncomfortable. In this way, the delay of the presentation of the picture to the driver is a serious problem when multiple cameras are utilized.

Likewise, as the number of cameras attached to the previously described vehicle surroundings image conversion device proliferates, the volume of the input buffer memory increases 3 frames for each one.

SUMMARY OF THE INVENTION

The present invention was developed in light of the previously described circumstances and its purpose is to offer a vehicle surroundings image conversion device, which shortens the delay in displaying the detected image, and which also decreases memory volume.

The present invention is an image conversion device connected to multiple image detection mechanisms and having multiple input buffers for each of the multiple image detection mechanisms, wherein each image detection mechanism detects and generates field image data of the surroundings. Each image detection mechanism has one or more input buffers, each input buffer having an input buffer input side which stores said field image data in 1 field units, and an input buffer output side which stores said field image data moved from the input buffer input side when image storage operation on the input buffer input side has been completed. Each image detection mechanism has one or more output buffers, each output buffer having an output buffer input side, which stores the data of multiple field images moved from the input buffer output side after said field image data has undergone conversion processing, and an output buffer output side which stores the converted field image data moved from said output buffer input side when storage operation on the output buffer input side has been completed. Also provided is a pattern memory in which corresponding relationships of the memory addresses of said respective input buffer output sides and the memory addresses of said output buffer inputs sides are stored, and an image conversion mechanism, which reads and performs conversion processing in 1 field units on said field image data stored in said input buffer output sides according to the relationships stored in said pattern memory, after said storage operation of said field image data in said input buffer output side has been completed, and then writes said converted field image data to the output buffer input side.

In an image conversion device like this, when converting image data generated by multiple image detection mechanisms which detect images of the surroundings and generate image data, the image conversion mechanism solves the problem described above by reading from the field image data stored in respective input buffer output sides of respective input buffers and performing conversion processing in 1 field units, and then writing to the output buffer input side of an output buffer in accordance with the corresponding relationships stored in pattern memory when the field image data has been completely read from the respective input buffer output sides.

Because the vehicle surroundings image conversion device of this invention transitions to address conversion processing at the time field image data from all image detection mechanisms has been completely stored in an input buffer and can store already converted field image data in an output buffer, it can achieve shortening of input delay time compared to devices performing processing in 1 frame units, and can also reduce the inconsistency between actual vehicle movement and field image data as well as reduce the memory volume of the input buffer.

BRIEF DESCRIPTION OF THE DRAWINGS

For fully understanding the nature and objects of the invention, reference should be made to the following detailed description of a preferred mode of practicing the invention, read in connection with the accompanying drawings in which:

FIG. 2($b$) is a diagram of the content displayed to the driver when a blind corner is presented to the driver as the driver's vehicle enters a T-shaped intersection;

FIG. 7 is a timing diagram when executing address conversion processing by single frame units.

DETAILED DESCRIPTION OF THE INVENTION

Figure 1:
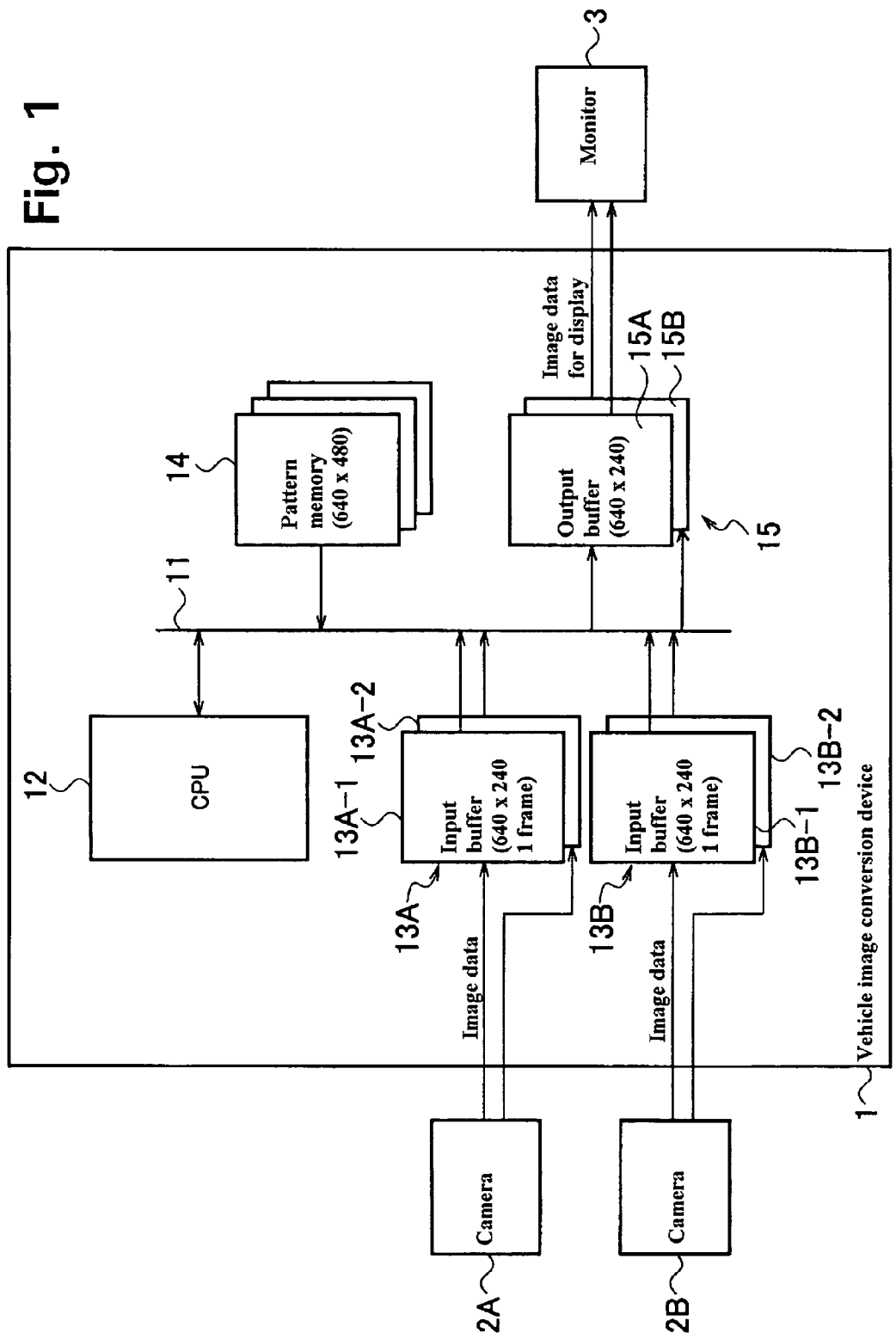
FIG. 1 is a block diagram showing a configuration of the driving support system containing the vehicle surroundings image conversion device according to the present invention.
Figure 2:
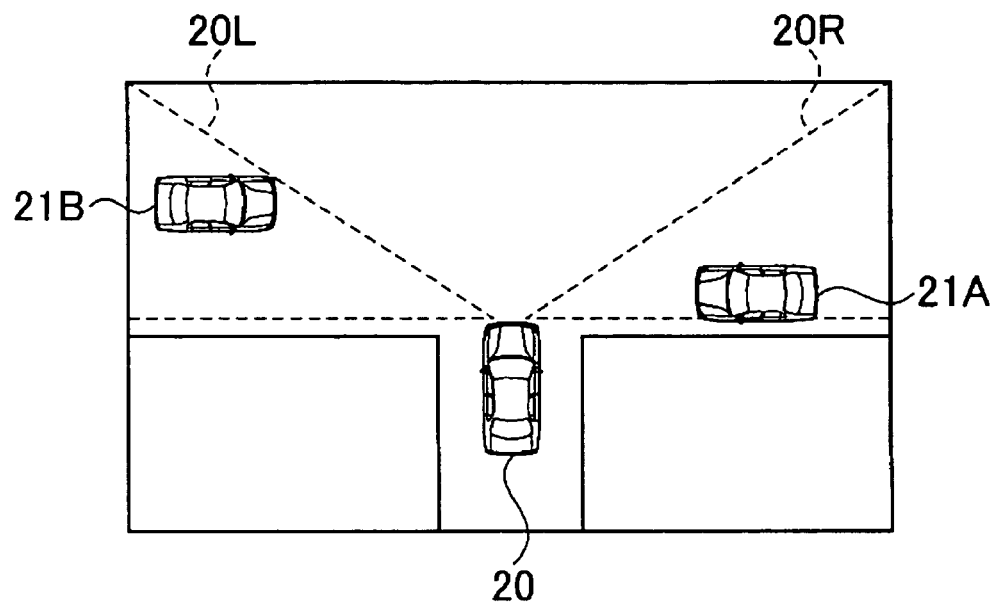
FIG. 2($a$) is a diagram of the content displayed to the driver by the vehicle surroundings image conversion device of the present invention when the driver's vehicle enters a T-shaped intersection.
Figure 2:
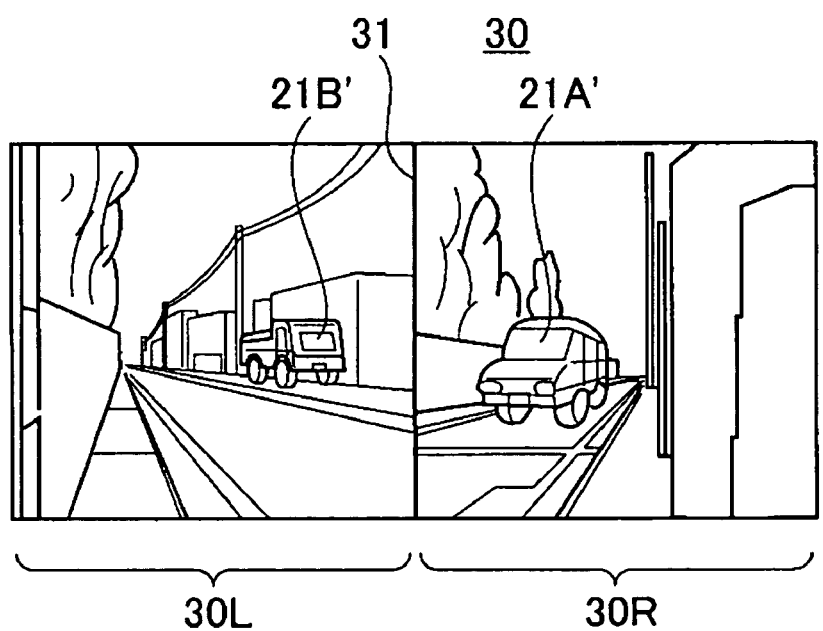

The present invention is applicable for a vehicle surroundings image conversion device 1 for a driving support system configured as shown in FIG. 1, for example. A driving support system furnished with vehicle surroundings image conversion device 1 allows a vehicle 20 entering a T-shaped intersection to display an area that is a blind angle to the driver of that vehicle. FIG. 2($a$) shows an example where the vehicle and other vehicles are at a T-shaped intersection with poor visibility. The device 1 captures an image of right side direction imaging sector 20R with NTSC camera 2A and captures an image of left side direction imaging sector 20L with NTSC camera 2B, by virtue of image conversion processing which will be discussed later. The device causes left and right side directions image 30, which is a so-called blind-corner view, to be displayed on display monitor 3 and is arranged on the screen as shown in FIG. 2(b), dividing right side direction image 30R which contains other vehicle 21A which corresponds to the other vehicle 21A of FIG. 2(a), and left side direction image 30L which contains other vehicle 21B which corresponds to the other vehicle 21B of FIG. 2(a) with dividing line 31.

By virtue of this, the driving support system can cause the driver of a vehicle 20 to be cognizant of other vehicle 21B which is approaching directly from the left direction relative to his vehicle and cognizant of other vehicle 21A which is approaching directly from the right direction relative to his vehicle.

Configuration of Vehicle Surroundings Image Conversion Device

This vehicle surroundings image conversion device 1 is configured with multiple NTSC cameras 2A and 2B, (hereafter, these will simply be called "NTSC" camera 2 when referring to them generically) mounted on the front of the vehicle body for example, and a display monitor 3 mounted with a display screen in a position which can be observed by the driver to which the cameras are connected. This vehicle surroundings image conversion device 1 performs image conversion processing of each image captured by NTSC cameras 2A and 2B and causes them to be displayed on display monitor 3.

Vehicle surroundings image conversion device 1 is configured with input buffer 13A, which is connected to CPU 12 and NTSC camera 2A, input buffer 13B, which is connected to NTSC camera 2B, and output buffer 15 which is connected to pattern memory 14 and display monitor 3 by data bus 11. Incidentally, in this embodiment, 2 NTSC cameras, 2A and 2B are connected to vehicle surroundings image conversion device 1, that is to say, 2 sources of image data exist which are the object of processing by CPU 12 and the resolution of the images captured by NTSC camera 2 and the resolution of display monitor 3 which presents it to the driver are VGA (Video Graphics Array, vertical 640 picture elements×horizontal 480 picture elements).

NTSC camera 2A and NTSC camera 2B, by generating image data in accordance with NTSC format, output interlaced format odd number field image data and even number field image data alternately to vehicle surroundings image conversion device 1. The NTSC camera 2A and NTSC camera 2B have respective internal clocks and generate image data for each field in accordance with these internal clocks and output this image data to vehicle surroundings image conversion device 1. Thus, as will be discussed later, the input timing of image data from NTSC camera 2A and the input timing of image data from NTSC camera 2B will be different in the vehicle surroundings image conversion device 1.

In this embodiment, because NTSC format is used for picture transmission format, NTSC camera 2A and NTSC camera 2B send 1 frame of image data to vehicle surroundings image conversion device 1 in 33 msec intervals. That is to say, odd number field image data and even number field image data is sent at 16.7 msec intervals.

Vehicle surroundings image conversion device 1 has input buffers 13A and 13B which correspond to the 2 cameras, NTSC camera 2A and 2B (hereafter called simply "input buffer 13" when referred to generically) and stores field image data input from NTSC camera 2A in input buffer 13A while it stores field image data input from NTSC camera 2B in input buffer 13B.

Input buffer 13A and input buffer 13B have 2 sides configured for each camera system. That is to say, input buffer 13A is configured with 2 field input buffer sides each of which is a memory area of 1 frame which stores frame image data, odd number field data on input buffer input side 13A-1 which is a memory area of 1 frame and, even number field data on input buffer input side 13A-2 which is a memory area of 1 frame. Similarly, input buffer 13B is configured with odd number field data on input buffer input side 13B-1 which is a 1 frame memory area and even number field data on input buffer input side 13B-2 which is a 1 frame memory area. Each of these buffer input sides has address space of 640 picture elements× 480 picture elements and the address space of 640 picture elements×240 picture elements which is the field image data of 1, comprises a buffer input side which inputs field image data from NTSC camera 2 and a buffer output side which stores field image data to be read by data bus 11.

In this way, the respective input buffers 13A and 13B are partitioned into odd number field image data storage areas and even number field image data storage areas. With input buffer 13A and input buffer 13B like this, since each buffer side is partitioned for each field image data, for each camera system there are 2 buffer sides of memory area furnished for odd number field storage having 640 picture element×240 picture element address space and 2 buffer sides of memory area furnished for even number field storage having 640 picture element×240 picture element address space.

The reason 2 buffer sides of memory areas are provided for each camera in this way is in order to standby for the arrival of image data which is the object for address conversion from all the camera systems connected to vehicle surroundings image conversion device 1 and in order to synchronize the timing of the completion of storage of image data from NTSC camera 2A in input buffer 13A and the timing of the completion of storage of image data from NTSC camera 2B in input buffer 13B.

Output buffer 15, similar to input buffer 13 is configured with odd number field output buffer side 15A which inputs and stores odd number field image data and even number field output buffer side 15B which stores even number field image data via data bus 11. Likewise odd number field output buffer side 15A and even number field output buffer side 15B each comprise an input side which stores field image data which has been converted from data bus 11 and an output side which stores field image data read to display monitor 3. By virtue of this, output buffer 15 has an input side which is for storing the results of address conversion processing and an output side which is for output processing to display monitor 3. Incidentally, providing the output buffer 15 with 2 sides for odd number fields and even number fields has the effect of reducing the flickering of the picture presented to the driver.

Pattern memory 14 uses the field image data stored in input buffer 13A and input buffer 13B and stores the data for performing image conversion processing by CPU 12. Pattern memory 14 stores the corresponding relationship between the memory address of input buffer 13 and the memory address of output buffer 15. This pattern memory 14 has a number of templates which correspond to the visual arrangement of the screen presented to the driver.

To be more specific, pattern memory 14 stores the corresponding relationship of the addresses of input buffer 13 and output buffer 15 when 3 images are displayed, one on the left and one on the right as in FIG. 2(b) and stores the corresponding relationship of the addresses when a camera which captures images below one's vehicle in addition to the previously mentioned NTSC camera 2A and NTSC camera 2B and a below-the-vehicle-image is displayed in the lower area of the screen in addition to the left and right side direction images.

Figure 3:
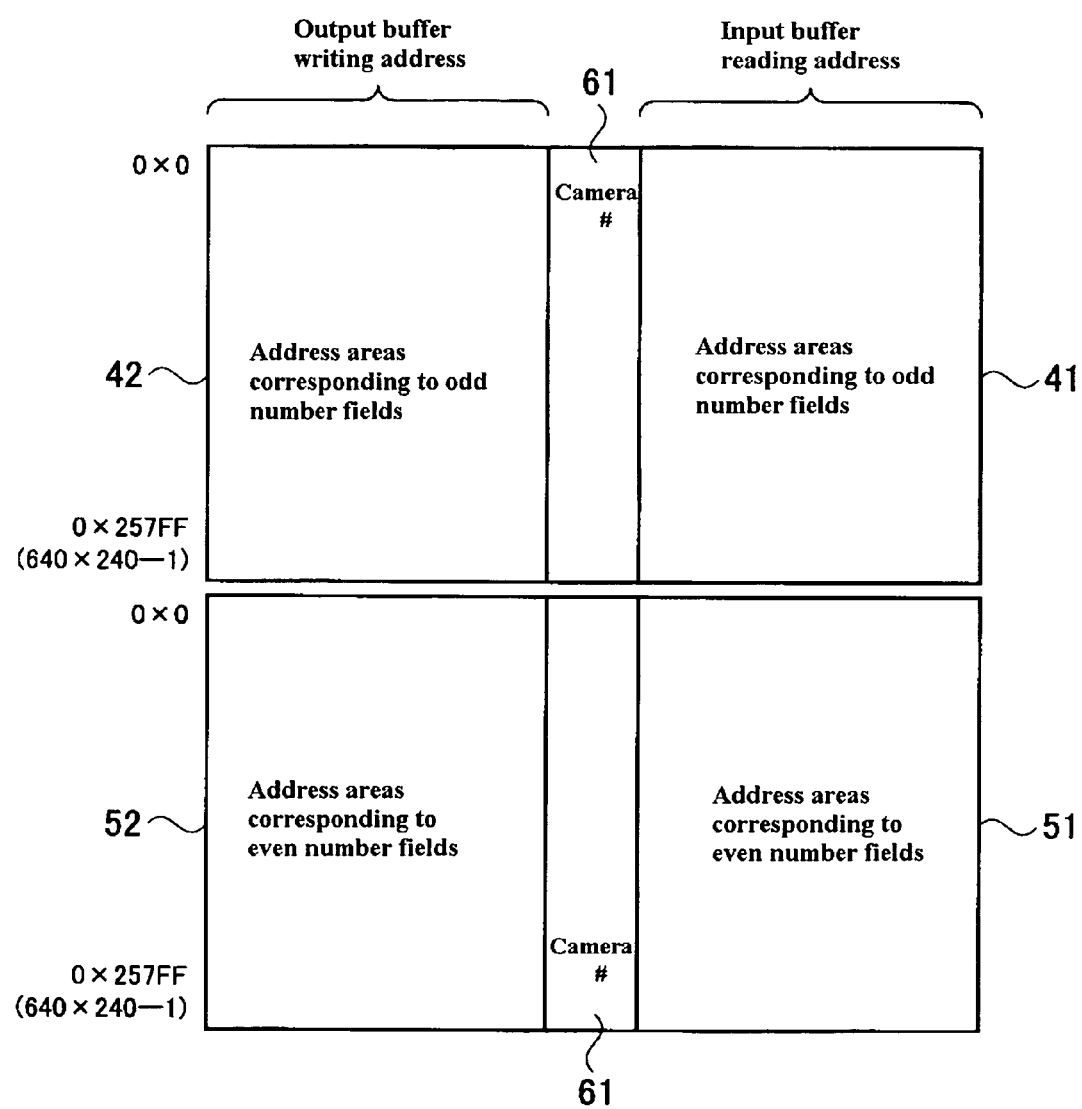
FIG. 3 is a diagram explaining the content in the pattern memory of the vehicle surroundings image conversion device according to the present invention.

In a pattern memory 14 like this, as is shown in an example in FIG. 3, a camera number area 61 for the purpose of identifying odd number field corresponding address area 41 for reading of odd number field input buffer sides 13A-1 and 13B-1, even number field corresponding address area 51 for reading even number field input buffer sides 13A-2 and 13B-2 and odd number field corresponding address area 42 for writing of odd number field output buffer side 15A, even number field corresponding address area 52 for reading even number field output buffer side 15B and input buffer 13A and input buffer 13B, that is to say to distinguish between NTSC camera 2A and NTSC camera 2B is mapped and configured.

Thus, CPU 12, by referring odd number field corresponding address area for reading 41, reads picture element signals of the odd number field image data stored in odd number field input buffer sides 13A-1 and 13B-1, and by referring odd number field corresponding address area for writing 42, it stores the picture element signal read in odd number field output buffer side 15A. Likewise, CPU 12, by referring even number field corresponding address area for reading 51, it reads the picture element signals of the even number field image data stored in even number field input buffer sides 13A-2 and 13B-2, and by referring even number field corresponding address area for writing 52, it stores the picture element signals read in even number field output buffer sides 15B. By virtue of this, it converts the odd number field image data of 640 picture elements×480 picture elements of 2 cameras into odd number field image data of 640 picture elements×240 picture elements and at the same time converts the even number field image data of 640 picture elements×480 picture elements of 2 cameras into even number field image data of 640 picture elements×240 picture elements.

Incidentally, odd number field corresponding address area for writing 42 and even number field corresponding address area for writing 52, when the output buffer 15 addresses are sequentially lined up from 0 (0×0) picture element to 640× 240–1 (0×257 FF), these areas can be deleted. Likewise, since the determination of whether a field is even or odd from the picture signal sent from NTSC camera 2 can be done by CPU 12, vehicle surroundings image conversion device 1 can switch the pattern memory to be used based on that determination.

Address Conversion Processing by Vehicle Surroundings Image Conversion Device

Figure 4:
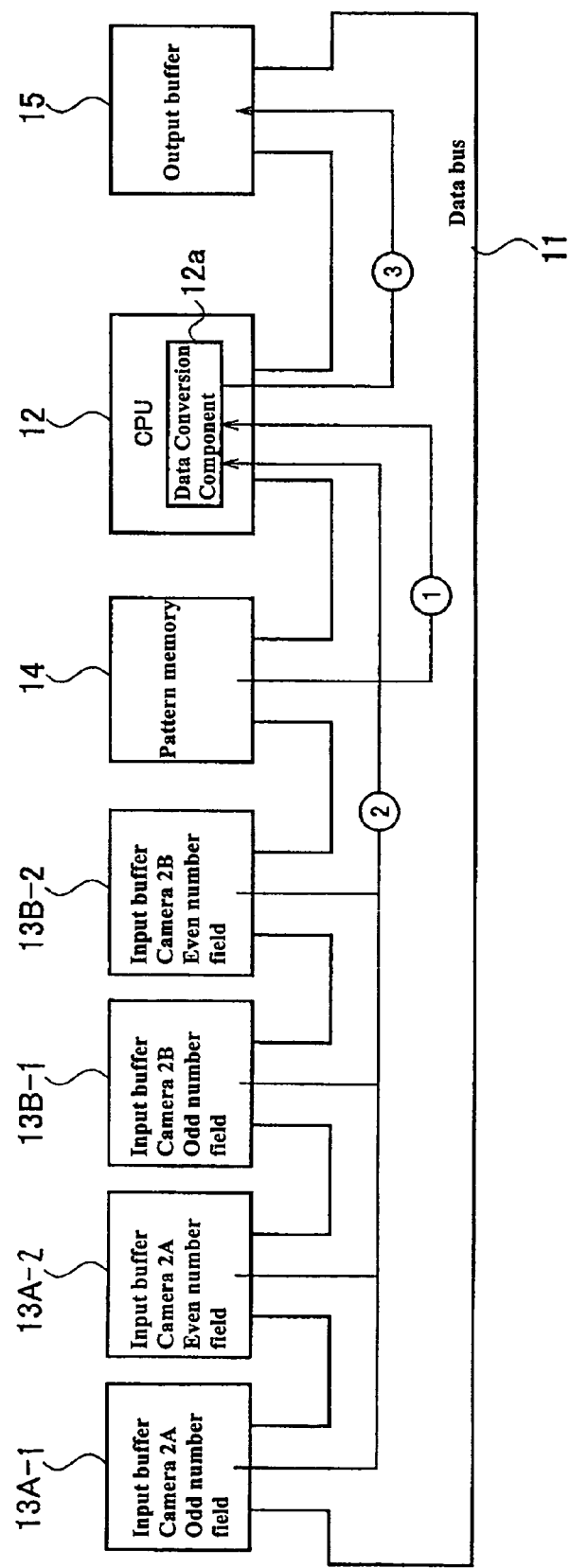
FIG. 4 is a block diagram explaining the data flow in the address conversion processing of the vehicle surroundings image conversion device according to the present invention.
Figure 5:
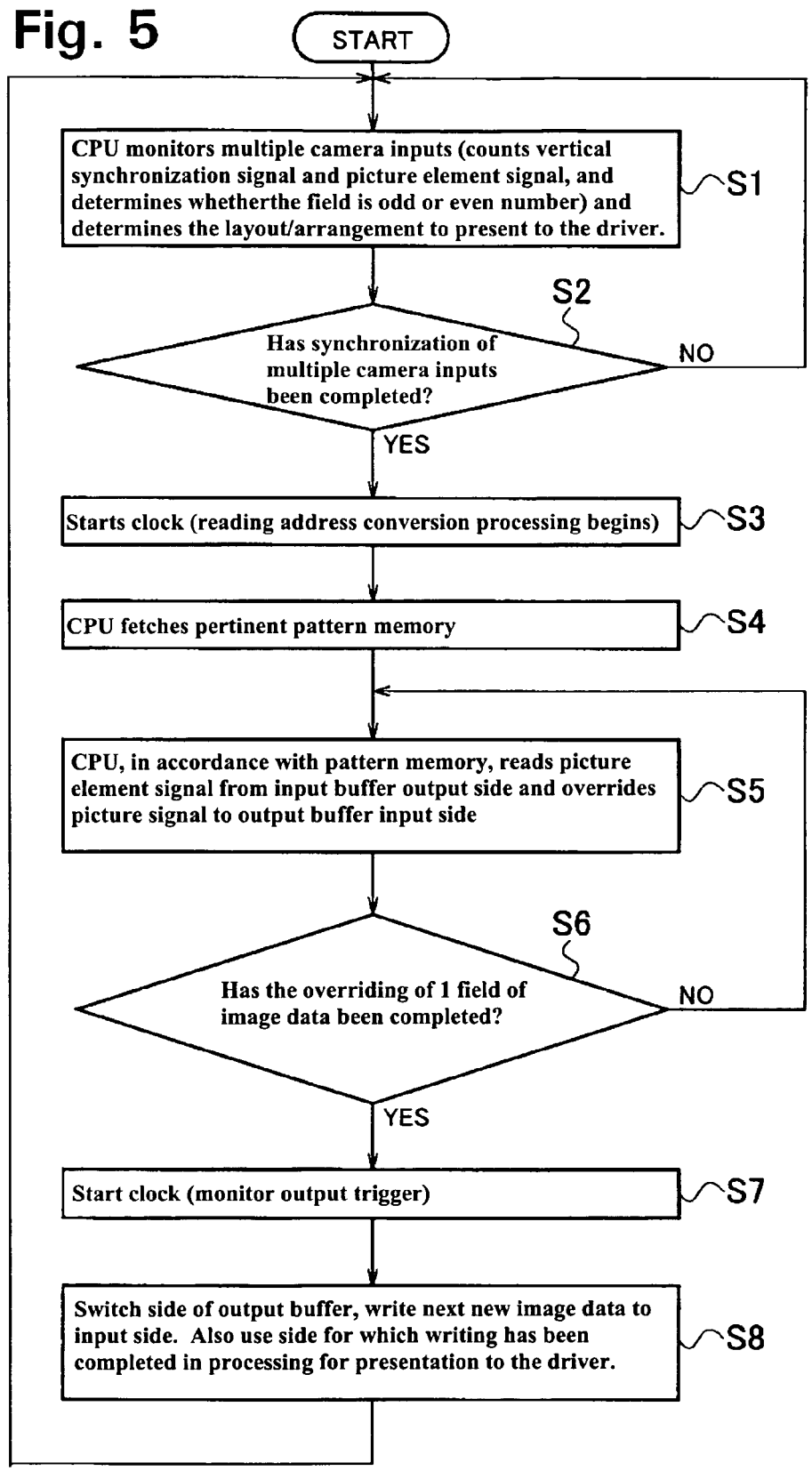
FIG. 5 is a flow chart showing the processing sequence of address conversion processing executed by the vehicle surroundings image conversion device according to the present invention.
Figure 6:
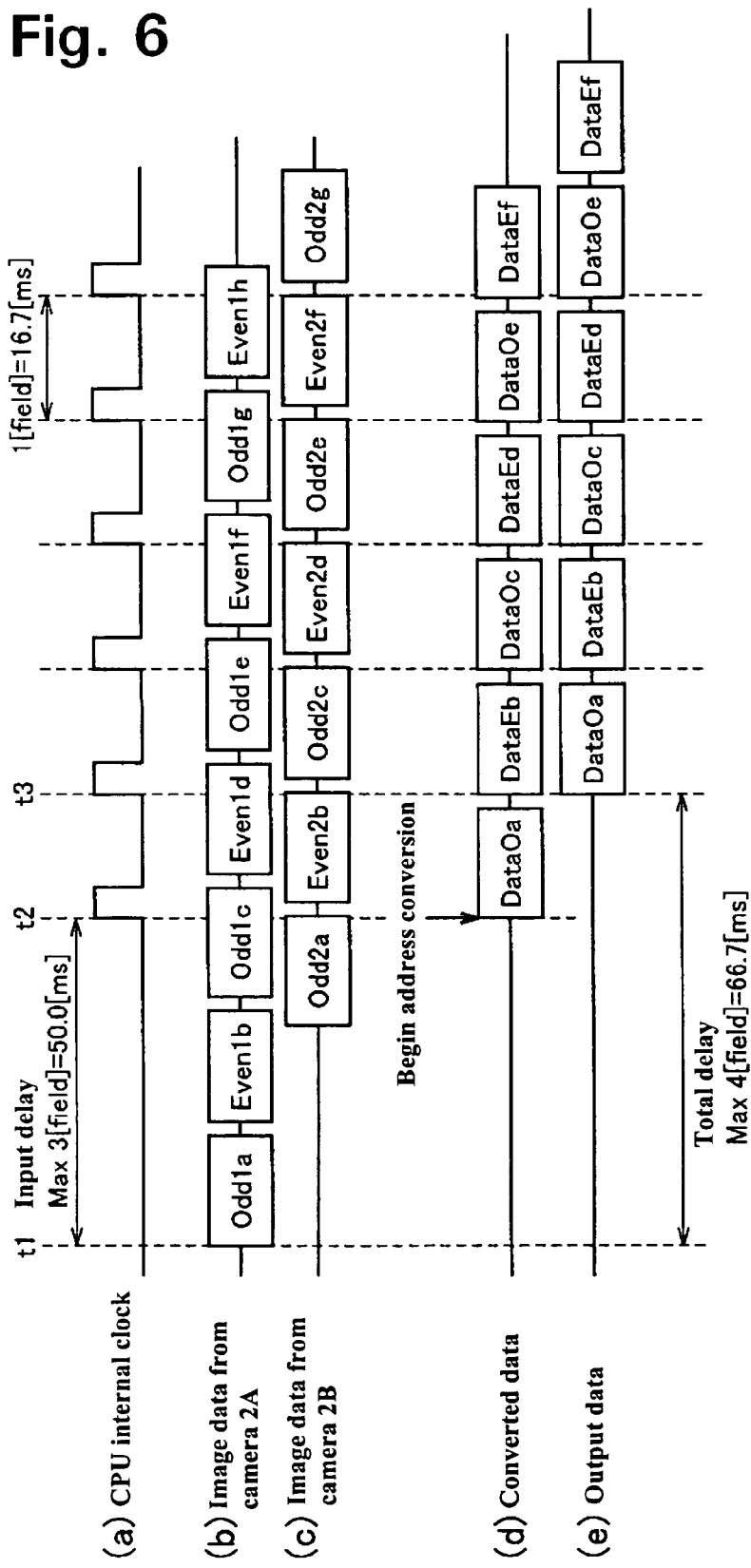
FIG. 6 is a timing diagram of the address conversion processing executed by the vehicle surroundings image conversion device according to the present invention.

Next, we shall explain the conversion processing by vehicle surroundings image conversion device 1 with reference to the flow of data of FIG. 4, the flow chart of FIG. 5 and the timing chart of FIG. 6.

In a vehicle surroundings image conversion device 1 like this, CPU 12, as is shown in FIG. 4, captures images at the same time in odd number field input buffer side 13A-1 and even number field input buffer side 13A-2, odd number field input buffer 13B-1 and even number field input buffer side 13B-2 and monitors that the same type of field image data, odd number field or even number field is stored (Step S1 of FIG. 5). At this time CPU 12, by detecting a superimposed vertical synchronizing signal, recognizes that field image data of 1 field has been stored in input buffer 13 and by detecting a horizontal synchronizing signal, counts the number of picture element signals and detects whether each field image data is an odd number field or even number field.

Also in this Step S1, CPU 12 determines the layout or arrangement that it will present to the driver from template information such as a display layout input mechanism to display monitor 3 which is not depicted. By this, CPU 12 determines the pattern designation when the vehicle surroundings will be displayed and determines the pattern memory 11 that is used when performing address conversion processing.

Then, CPU 12, by determining whether or not the odd number field image data captured at nearly the same time by NTSC camera 2A and NTSC camera 2B has been stored in the output side of odd number field input buffer side 13A-1 and the output side of odd number field input buffer side 13B-1, determines whether the synchronization of the outputs of NTSC camera 2A and NTSC camera 2B has been completed (Step S2 of FIG. 5). Then, when CPU 12 determines that synchronization has not been completed it continues the processing of Step S1 and if it determines that synchronization has been completed it advances processing to Step S3.

In this way the period when it repeats Step S1 and Step S2 and the synchronization of NTSC camera 2A and NTSC camera 2B has not been completed, becomes the delay time which is the time t1 through time t2 as shown in FIG. 6. That is to say, the odd number field image data Odd 1a, from NTSC camera 2A and the Even number field image data Even 1b is first input (FIG. 6(b)) and this is when the odd number field image data Odd 2a from NTSC camera 2B is input within the 1 frame period of this NTSC camera 2A. (FIG. 6(c)). At this time vehicle surroundings image conversion device 1 has completed storage of the odd number field image data Odd 1a and Even number field image data Even 1b in input buffer 13A and the time when it completes the storage of odd number field image data Odd 2a from the input side of odd number field input buffer side 13B-1 to the output side of odd number field input buffer side 13B-1 is t2. In this state, the odd number field image data captured by NTSC camera 2A and the odd number field image data captured by NTSC camera 2B are both stored in the output sides of odd number field input buffer sides 13A-1 and 13B-1. By virtue of this, vehicle surroundings image conversion device 1, even if the field image data input timing from NTSC camera 2A and the field image data input timing from NTSC camera 2B are asynchronous, Step S2 will absorb the time discrepancy.

Then, in Step S3, CPU 12 determines that address conversion processing is to begin and starts an internal clock for performing this address conversion processing (see FIG. 6(a)). This internal clock, similar to NTSC camera 2A and NTSC camera 2B counts 1 frame in NTSC format in 33 msec intervals and 1 field in 16.7 msec intervals. Then, CPU 12 in subsequent processing, moves the field image data from the input side to the output side of input buffer 13, performs address conversion processing and stores the processed field image data on the input side of the output buffer 15, and moves the processed field image data from the input side to the output side of output buffer 15 in 1 field intervals.

Incidentally, the starting of the internal clock in Step S3 may be generated by the vehicle surroundings image conversion device 1 internal frequency source, or may be the vertical synchronizing signal of the next picture signal received, in other words a signal from outside the vehicle surroundings image conversion device 1 may be used as a clock.

Next, CPU 12, as shown in (1) of FIG. 4, in Step S4, first reads pattern memory 14. At this time, CPU 12 reads pattern memory 14 in accordance with the screen arrangement/layout that will be presented to the driver which is the screen arrangement/layout determined in Step S1.

Likewise, CPU 12, distinguishes whether the field image data whose storage had been completed in the output side of input buffer 13A and the output side of input buffer 13B and whose time discrepancy has been absorbed is an odd number field image data or an even number field image data by virtue of the determination of Step S1 and reads this from pattern memory 14. To be more specific, at time t2 of FIG. 6, since the field image data whose storage in the output side of input buffer 13A and the output side of input buffer 13B had been completed is an odd number field image data, it reads a pattern memory 14 for odd number field image data.

Next, CPU 12, in Step S5, refers the odd number field corresponding address area for reading of the pattern memory 14 read in Step S4, fetches the applicable picture element signal from the output side of odd number field input buffer 13A-1 and writes to the input side of the odd number field output buffer 15A of the address area applicable to the odd number field corresponding address area 42 for writing. More specifically, at time t2 of FIG. 6, as shown by (2) of FIG. 4, it reads picture element signals from the output side of odd number field input buffer 13A-1 with data conversion section 12a and, as shown by (3) of FIG. 4, writes to the input side of odd number field output buffer 15A-1 with data conversion section 12a. By virtue of this, CPU 12 executes override address conversion processing of the picture element signal from input buffer 13 to output buffer 15.

Incidentally, although it executes address conversion processing from this time t2, since field image data is continuously input from NTSC camera 2A and NTSC camera 2B, CPU 12 performs in parallel the data input to the input side of input buffer 13A and the input side of input buffer 13B, the movement of field image data from the input side of input buffer 13A to the output side of input buffer 13A and the movement of field image data from the input side of input buffer 13B to the output side of input buffer 13B.

Next, CPU 12, in Step S6, determines whether or not the override of the picture element signal of 1 frame (640×240 picture elements) as a result of performing the override of the picture element signal of Step S5 has been completed. At this time, CPU 12, when it has determined that the final address conversion in 1 field contained in pattern memory 14 has been completed, it determines that the override of the picture element signal of 1 frame has been completed, advances to Step S7, and when that is not the case repeats the address conversion processing of Step S5.

In Step S7, CPU 12, when it has determined that the override of the picture element signal of 1 frame in Step S6 has been completed, that is to say at time t3 in FIG. 6 it starts the clock which is the trigger (monitor output trigger) which outputs the field image data which has been converted to display monitor 3 (see FIG. 6(a)). The clock which generates this monitor output trigger counts, similar to the address conversion processing clock, in intervals of 16.7 msec for 1 field. With respect to the clock which generates this monitor output trigger, because the time required for address conversion processing is a fixed time less than 1 field interval which does not depend on the arrangement/layout presented to the driver, monitor output triggers subsequently generated use the timing of this clock.

Incidentally this clock may be generated by the vehicle surroundings image conversion device 1 internal frequency source, or may be the vertical synchronizing signal of the next picture signal received, in other words a signal from outside the vehicle surroundings image conversion device 1 may be used as a clock. Further, as is shown in FIG. 6(a), it is preferable that the clock used in starting the previously mentioned address conversion processing and the clock which generates the monitor output trigger be used in common. By virtue of this the timing circuits in vehicle surroundings image conversion device 1 can be consolidated, the number of the circuits reduced and address conversion processing in vehicle surroundings image conversion device 1 is simplified.

Next, CPU 12, in Step S8, when the address conversion processing of 1 field has been completed because all field image data for display which will be presented to the driver has been stored in output buffer 15, writes the field image data for display stored in the input side of output buffer 15 by the determination of Step S6 to the output side of output buffer 15.

Incidentally, the input side of output buffer 15 whose field image data for display was read will have new field image data written in by the next address conversion processing. Likewise, the period until CPU 12 writes the field image data for display to the output side of output buffer 15, as shown in FIG. 6, becomes the total delay time including the input delay time.

Then, CPU 12, by causing the field image data for display which was written to the output side of output buffer 15 to be output to display monitor 3 in field intervals, presents a blind corner view of right and left side directions like that shown in FIG. 2(b) to the driver and refreshes the display of display monitor 3 and returns processing to Step S1. Incidentally, for the output timing of field image data to display monitor 3, one may choose to use either a clock independent from the conversion processing timing of address conversion processing or a field image data vertical synchronizing signal or further may use a clock used in common with conversion processing.

With a vehicle surroundings image conversion device 1 which performs address conversion processing like this, at the same time the input of odd number field image data Odd 1a and Odd 2a to the output sides of input buffer 13A and input buffer 13B is completed, which is the time t2 of FIG. 6, it begins address conversion processing and stores odd number field image data Data Oa (conversion data) which has been converted in the input side of output buffer 15 (FIG. 6d)) and can store odd number field image data Data Oa stored in the input side of output buffer 15 at time t3 after a period of 1 field has elapsed from time t2 as output data in the output side of output buffer 15 (FIG. 6(e)) Likewise after it has output odd number field image data Data Oa to display monitor 3, it can output even number field image data Data Eb to display monitor 3 after a period of 1 field has elapsed from time t3.

In other words, it performs processing Steps S1 through S8 for respective field image data and by beginning Step S1 processing with each 1 field period when performing Steps S1 through S6 for odd number field image data it can begin processing for even number field image data. Thus, with this vehicle surroundings image conversion device 1 while it is presenting odd number field image data with display monitor 3, it stores even number field image data in the output side of even number field output buffer 15B and can output even number field image data to display monitor 3 at the time the display of odd number field image data has ended. Because of this the resolution of display monitor 3 is the same as before.

Effect of the Invention

As explained in detail earlier, because the first embodiment of the vehicle surroundings image conversion device 1 which applies this invention transitions to address conversion processing when it finishes storing all field image data from NTSC camera 2 in the output sides of input buffers 13A and 13B and can store already converted field image data in the input side of output buffer 15, it can shorten the input delay time compared to when address conversion processing is begun in 1 frame units. Thus, this vehicle surroundings image conversion device 1 can reduce the inconsistency between the actual movement of a vehicle and the picture of display monitor 3 which arises because the input delay time is long and can avoid making the driver feel uneasy.

More specifically, because pattern memory 14 corresponding to odd number fields is used to perform address conversion processing for odd number field image data and pattern memory 14 corresponding to even number fields is used to perform address conversion processing for even number field image data, as shown in FIG. 6, it can limit the time required for synchronization in input buffer 13 to a maximum 50 msec delay which is equivalent to the amount of 3 fields. Likewise, because there is an additional delay of 16.7 msec which is equivalent to the amount of 1 field when it performs address conversion processing until it outputs to display monitor 3, the total delay in vehicle surroundings image conversion device 1 can be made a maximum of the amount of 4 fields (the amount of 2 frames), in other words a maximum of 66.7 msec.

Likewise, although the input timing of field image data with multiple NTSC cameras 2 differs with this vehicle surroundings image conversion device 1 and synchronization is required, compared with beginning address conversion processing with 1 frame units, it can reduce the volume of input buffer 13 because it begins address conversion processing with field units.

In contrast, whereas an input buffer having an address space of 3 frames×camera 2 systems is necessary when performing processing with frame units, with vehicle surroundings image conversion device 1 address conversion processing can be effectuated with an input buffer 13 having an address space of 4 fields (2 frames)×camera 2 systems and buffer capacity can decreased ⅔.

Moreover, this vehicle surroundings image conversion device 1, is capable of using the vertical synchronization signal contained in the field image data stored in input buffer 13, determining that the storage portion of the field image data in the output sides of input buffers 13A and 13B is completed and performing the address conversion processing, there is no longer a need to have a clock circuit frequency source internally and the number of circuits can be reduced.

Still further, with this vehicle surroundings image conversion device 1, since it alternately writes odd number field image data and even number field image data to the input side of output buffer 15 it prevents things like overriding odd number fields with even number fields and even number fields with odd number fields and can reduce the flickering of the monitor image presented to the driver.

In addition, with this vehicle surroundings image conversion device 1, when it causes the converted field image data stored in the output side of output buffer 15 to be output to the display monitor 3, it uses the frequency source which is the internal clock circuit or the vertical synchronization signal contained in field image data, it can output and present to the driver the results of address conversion processing with the output trigger chosen.

Moreover, with this vehicle surroundings image conversion device 1, one can vary the timing that field image data is presented to the driver according to the time required for address conversion processing by configuring it so that it one chooses between generating output timing to the display monitor 3 from an internal frequency source and generating it from a vertical synchronization signal. That is to say, it can attain synchronization with high reliability when using an internal frequency source even when noise is contained in a vertical synchronization signal and it cannot be detected, and on the other hand, it can make an internal clock circuit unnecessary when a vertical synchronization signal is used.

Likewise, with vehicle surroundings image conversion device 1, because it can determine conversion processing timing and output timing with the same timing, the internal timing circuits can be consolidated, the number of circuits can be reduced and address conversion processing can be simplified.

Incidentally, the embodiment described above is merely one example of this invention. Hence, this invention is not limited to the previously described embodiment and to the extent that they do not depart from the technical ideas of this invention various alterations in design are of course possible though they may be other embodiments than this.

That is to say, while the invention was explained in the previously described embodiment with address conversion processing controlled by CPU 12, it may also be performed by such things as LSI (Large Scale Integrated Circuit), FPGA (Field Programmable Gate Array and DSP (Digital Signal Processor).

Likewise, the number of NTSC cameras connected to vehicle surroundings image conversion device 1 was 2 in the previously described embodiment, it is not limited to this. Furthermore, camera 2 and display monitor 3 may utilize any resolution and format.

| List of Designations: | |
| --- | --- |
| 1 | vehicle surroundings image conversion device |
| 2 | NTSC camera (imaging mechanism) |
| 3 | display monitor |
| 11 | data bus |
| 12 | CPU (image conversion mechanism) |
| 13 | Input buffer |
| 13A-1, 13B-1 | Odd number field input buffer side |
| 13A-2, 13B-2 | Even number field input buffer side |
| 14 | pattern memory |
| 15 | output buffer |
| 15A | Odd number field output buffer side |
| 15B | Even number field output buffer side |
| 20 | A driver's vehicle [with the vehicle surroundings image conversion device which applies this invention] |
| 21 | Other vehicles |
| 30 | left and right side direction images |
| 31 | dividing line |
| 41 | Odd number field associated address areas for reading |
| 42 | Odd number field associated address areas for writing |
| 51 | Even number field associated address areas for reading |
| 52 | Even number field associated address areas for writing |
| 61 | Camera number area |

What is claimed:

1. An image conversion device configured to be connected to multiple image detection mechanisms, with each image detection mechanism generating and converting field image data to output an indication image data on one indication monitor, comprising:

a plurality of input buffers corresponding to the image detection mechanisms, each of the input buffers having an input buffer input side and an input buffer output side, the input buffer input sides storing field image data from the image detection mechanism in one field units, and the input buffer output sides storing the field image data from the corresponding one of the image detection mechanisms that is moved from the input buffer input side to the input buffer output side when image storage operation on the input buffer input side has been completed;

a plurality of output buffers with each of the output buffers having an output buffer input side and an output buffer output side, the output buffers storing the field image data in the input buffer output side after the field image data has undergone conversion processing, and moving the field image data to the output buffer output side after storage of the field image data on the output buffer input side has been completed;

a pattern memory storing corresponding relationships of memory addresses of respective ones of the input buffer output sides of the input buffers and memory addresses of respective ones of the output buffer input sides of the output buffers; and an image conversion mechanism configured to perform the conversion processing in one field units by reading in the field image data stored in the input buffer output sides of the input buffers and writing into the output buffer input sides of the output buffers in accordance with the corresponding relationships of the pattern memory, when storage of the field image data has been completed in the output buffer input sides of the input buffers.

2. The image conversion device of claim 1, wherein the image conversion mechanism uses a vertical synchronization signal contained in the field image data stored in said input buffer, determines the storage operation of the field image data in the input buffer is complete, and performs the conversion processing.

3. The image conversion device of claim 1, wherein the image conversion mechanism alternately reads odd number field image data and even number field image data from the input buffer output side and alternately writes odd number field image data and even number field image data to the output buffer input side.

4. The image conversion device of claim 1, wherein the image conversion mechanism moves and stores the converted field image data stored in the output buffer input side to the output buffer output side and outputs the converted field image data to a display monitor in accordance with output timing.

5. The image conversion device of claim 4, wherein the image conversion mechanism generates the output timing with an internal frequency source.

6. The image conversion device of claim 4, wherein the image conversion mechanism generates the output timing from a vertical synchronization signal contained in the field image data from the respective image detection mechanisms.

7. The image conversion device of claim 4, wherein the image conversion mechanism selects an output timing source when the output timing is generated by an internal frequency source and a vertical synchronization signal contained in the field image data from the respective image detection mechanisms.

8. The image conversion device of claim 4, wherein the image conversion mechanism determines that the timing of the conversion processing and the output timing are the same.

* * * * *